(Model.)
P. COUGHLIN.
Fence Post.
No. 238,358. Patented March 1, 1881.
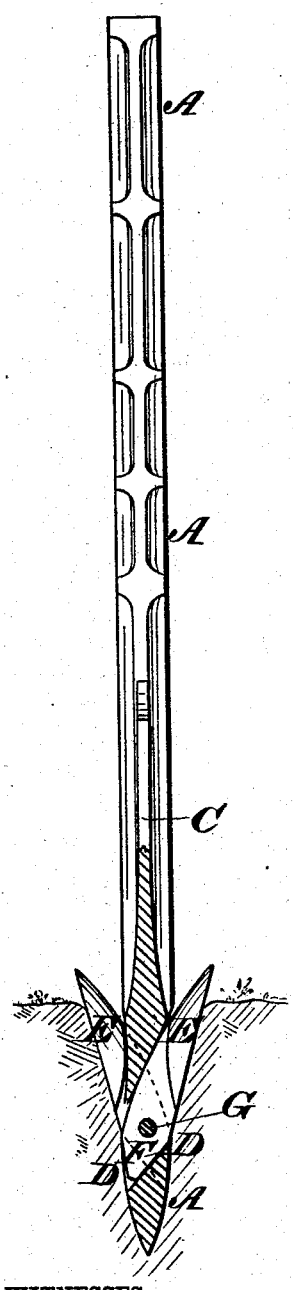
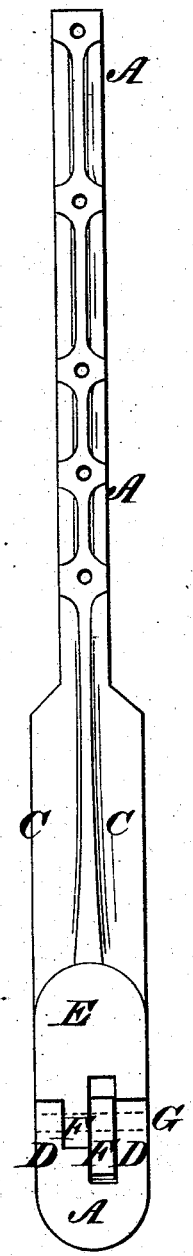
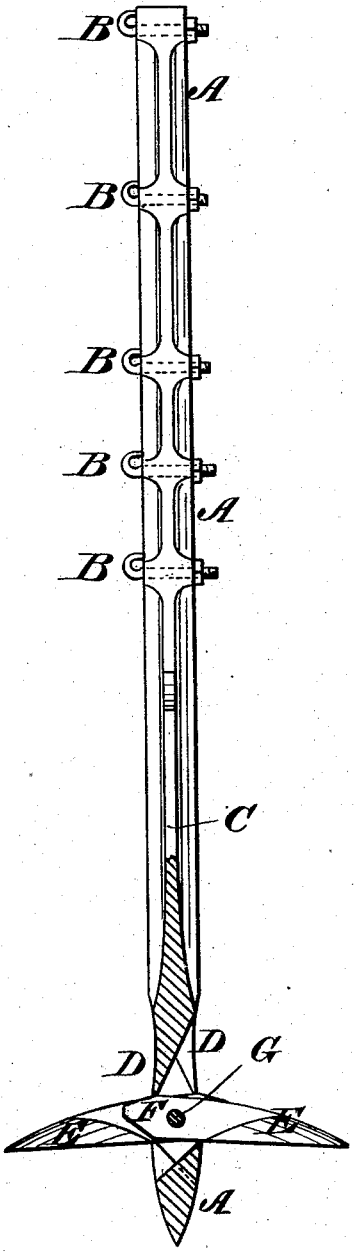
WITNESSES:
Donn P. Twitchell
C. Sedgwick
INVENTOR:
P. Coughlin
BY Munn & Co
ATTORNEYS.

UNITED STATES PATENT OFFICE.

PATRICK COUGHLIN, OF PRESCOTT, ONTARIO, CANADA.

FENCE-POST.

SPECIFICATION forming part of Letters Patent No. 238,358, dated March 1, 1881.

Application filed July 17, 1880. (Model.)

*To all whom it may concern:*

Be it known that I, PATRICK COUGHLIN, of Prescott, Greenville county, Province of Ontario, Dominion of Canada, have invented a new and useful Improvement in Fence-Posts, of which the following is a specification.

Figure 1 is an edge elevation of the improvement, partly in section. Fig. 2 is a side elevation, and Fig. 3 is an edge elevation, partly in section, and showing the wings expanded.

The object of this invention is to furnish posts so constructed that they cannot be thrown out by the frost, and which at the same time shall be strong and durable.

A represents the body of the post, the upper part of which is made square, with its corners gouged out between the points where the wires are to be attached. The post A has holes drilled through it to receive the bolts B, which are made with hook-heads, and have nuts screwed upon their ends, so as to clamp the wires against the side of the post, and thus hold them securely. Upon the lower part of the post A, that enters the ground, and in line with the fence, are formed flanges C, to give the posts a wide lateral bearing against the ground to prevent the fence from tilting toward either side. The lower end of the post A is rounded off, as shown in Fig. 2, and is made wedge-shaped, as shown in Figs. 1 and 3, so that it can be driven into the ground readily with a mallet or beetle, rendering it unnecessary to dig or bore post-holes. In the lower part of the post A, near its wedge-shaped lower end, are formed two mortises, D, which are made side by side, so that their middle parts may open into each other, and which incline downward from the opposite sides of the post.

E are two wings, the lower sides of which are made flat, and their upper sides are rounded off or convexed, bringing them to an edge at their sides and outer ends, and having their outer ends rounded off. Upon the inner ends of the wings E, upon the opposite sides of their centers, are formed tenons F, to fit into the mortises D, where they are hinged by a pin, G, passing through them and through the post A, as shown in the drawings.

In setting the posts, they are driven into the ground with a mallet or beetle, the wings taking an upwardly-inclined position, as shown in Fig. 1, so that they will enter the ground readily. The posts are driven into the ground about six inches farther than they are intended to stand, and are then raised or drawn upward about six inches with a lever or jack, which causes the wings E to force themselves outward into the ground until they are in a horizontal position, as shown in Fig. 3. After the wings E have taken a horizontal position the posts A cannot be raised without raising the entire mass of soil above the wings E, as the tenons F rest against the shoulders of the mortises D, so that the said wings cannot turn down below a horizontal position.

Having thus described my invention, I claim as new and desire to secure by Letters Patent—

The combination, with the post A, provided with mortises D in its lower end, of the wings E, having their lower ends flat and their upper sides convexed and provided with the tenons F, pivoted by pins G in the said mortises, substantially as and for the purpose set forth.

PATRICK COUGHLIN.

Witnesses:
JAMES HEGARTY,
FRANCIS EDWIN BERTRAND.